United States Patent [19]

West

[11] 3,975,098

[45] Aug. 17, 1976

[54] SPECTROFLUORIMETER

[75] Inventor: Michael Anthony West, London, England

[73] Assignee: Applied Photophysics Limited, London, England

[22] Filed: Aug. 5, 1975

[21] Appl. No.: 602,050

[52] U.S. Cl. .............................. 356/85; 250/363 R; 250/365; 250/461 R; 356/97
[51] Int. Cl.² ........................ G01J 3/30; G01J 3/42
[58] Field of Search .......................... 356/85, 97, 98; 250/361, 363, 364, 365, 458, 459, 461

[56] References Cited
UNITED STATES PATENTS

| | | | |
|---|---|---|---|
| 3,832,555 | 8/1974 | Ohnishi | 356/97 |
| 3,886,363 | 5/1975 | Ohnishi et al. | 356/98 |

*Primary Examiner*—Vincent P. McGraw
*Attorney, Agent, or Firm*—Sughrue, Rothwell, Mion, Zinn & Macpeak

[57] ABSTRACT

A spectrofluorimeter for measuring excitation and emission spectra uses a flash or pulsed light source, an excitation monochrometer adjustable by a stepping motor, a first optical system for directing radiation onto a sample under test, a reference light detector for monitoring the excitation radiation, an emission monochrometer, also adjustable by a stepping motor, for receiving radiation via a second optical system from the sample and directing selected wavelengths to a detection photomultiplier, the first and second optical systems being corrected for spherical and chromatic alterations.

11 Claims, 10 Drawing Figures

SPECTROFLUORIMETER

BACKGROUND OF THE INVENTION

The invention relates to luminescence spectroscopy and in particular to spectrofluorimeters for measuring in terms of wavelength the luminescence emitted by sample specimens including measurements of fluorescence and phosphorescence.

Luminescence spectroscopy has found wide acceptance for both qualitative and quantitative measurements of a wide variety of materials including drugs and other pharmaceuticals, biochemical and biological materials and organic and inorganic substances. For example, clinical analyses employ fluorescence methods for determination of steroids, estrogens, catecholamines, nucleic acids, enzymes and proteins. Pharmaceutical applications include measurement of aspirin in blood and riboflavin and other medicines. Organic substances in general can often be characterized by fluorescence measurements and there are numerous applications in industries as diverse as tobacco, beer, detergent, printing, oil and insecticides.

The present invention relates to spectrofluorimeters in which light from a source with a continuous spectrum is passed through an excitation monochromator and used to excite a fluorescence sample. Light emitted from the sample is passed through an emission monochromator and subsequently detected. By using a scanning spectrofluorimeter in which the wavelengths transmitted by both the excitation monochromator and emission monochromator is variable, it is possible to examine both emission and excitation spectra. With emission spectra the wavelength of the exciting radiation is maintained constant and measurements on the emitted radiation are carried out at varying wavelengths. With excitation spectra the wavelength of the detected radiation is maintained constant while the wavelength of the exciting radiation is varied.

The sensitivity and selectivity of emission measurements in luminescence spectroscopy is several orders of magnitude higher than conventional absorption spectroscopy measurements. In existing instruments, D.C. methods of detection limit the maximum sensitivity obtainable because of shot noise, etc. Furthermore, optical systems using lenses and non-achromatic mirrors together with the absence of any device to monitor and correct for fluctuations in excitation beam intensities (for both time and wavelength), do not allow accurate excitation and emission spectra to be recorded because of inherent instrumental defects. The preferred embodiment described here has exceptional sensitivity and selectivity and provides corrected excitation spectra and emission spectra which may be corrected easily with the use of a standard light source. The high sensitivity of the instrument allows low excitation beam light levels to be used thereby avoiding sample photodecomposition.

It is an object of the present invention to provide an improved sensitive spectrofluorimeter capable of measuring both emission and excitation spectra.

SUMMARY OF THE PRESENT INVENTION

The present invention provides a spectrofluorimeter for detecting intensity of luminescence at various wavelengths emitted by a sample under test, which comprises a sample station whereat a sample may be located at a predetermined location, a flash or pulsed source of light, including a plasma discharge lamp, arranged to produce exciting radiation over a continuous range of wavelengths and emit radiation with intermittent intensity peaks at a desired frequency, an excitation monochromator located between the source and the sample station for transmitting radiation at a selected wavelength towards the sample, a first optical system arranged to focus light from the excitation monochromator at the sample station, means located in the radiation path between the excitation monochromator and the sample station to direct a reference beam of radiation to a reference radiation detector and thereby provide a correction signal for fluctuations in light intensity from the source, an emission monochromator arranged to receive luminescence from the sample under test via a second optical system and transmit radiation at a selected wavelength towards a detection system, a stepping motor for each of the two monochromators for varying the wavelength of radiation transmitted by the monochromators, the detection system including a photomultiplier responsive to the radiation transmitted by the emission monochromator and arranged to provide a signal dependent on the intensity of luminescence at the wavelength transmitted by the emission monochromator, and the first and second optical systems being corrected for spherical and chromatic aberrations.

The plasma discharge lamp contains gas through which a discharge occurs to produce flashes or pulsed light. The lamp is normally energised by the sudden release of high peak electrical energy so as to elevate the temperature of the plasma to a level at which high peak light flashes having a substantially continuous spectrum are generated.

Preferably the first and second optical systems comprise spherical or elliptical mirrors and thereby avoid the use of lenses.

Spectrofluorimeters are known which use D.C. methods for detection and sensitivity and selectivity is limited by noise arising from D.C. sources such as stray light and shot noise. To avoid this, the spectrofluorimeter of the present invention preferably uses a lock-in amplifier, box car detector, or photon counting system in the detection system. In the case of a lock-in amplifier or box car detector an amplifier is arranged to detect signals from the photomultiplier only at the said desired frequency at which light is emitted from the light source. In this way stray light signals of different frequency are eliminated. In the case of a photon counting system readings may be taken when light is emitted by the light source and during periods when no light is emitted from the light source so that in this way a dark count is taken which can be used to achieve a corrected output reading. This is required for low level fluorescence signals which are comparable in magnitude with the dark count.

Preferably the reference radiation detector comprises a photomultiplier arranged to receive an intermittent signal from the radiation beam directed towards the sample station. The means located between the excitation monochromator and the sample station to direct radiation to the reference radiation detector may comprise a reflecting device arranged to provide intermittent reflection to the reference photomultiplier. The reference photomultiplier is preferably arranged to compensate for variations in intensity of the excitation beam with wavelength as well as time. To achieve this, the reference photomultiplier may include a wavelength converter such as a solution of rhodamine B in ethylene glycol in the radiation path leading to the reference photomultiplier so that as the wavelength of radiation directed towards the sample is changed, the wavelength converter converts the radiation to a fixed wavelength or spectrum so that the reference photomultiplier always receives radiation of the same wavelength.

Preferably the sample station is located in a housing having access over a range of more than 180° so that automatic feeding of samples to the station is simplified. Preferably the sample station housing is arranged to project at one side of the spectrofluorimeter so that access to the housing is provided on three sides. In this way samples may enter and leave the station by passing along a linear path through two opposite sides of the housing.

DESCRIPTION OF THE PREFERRED EMBODIMENTS

Figure 1:
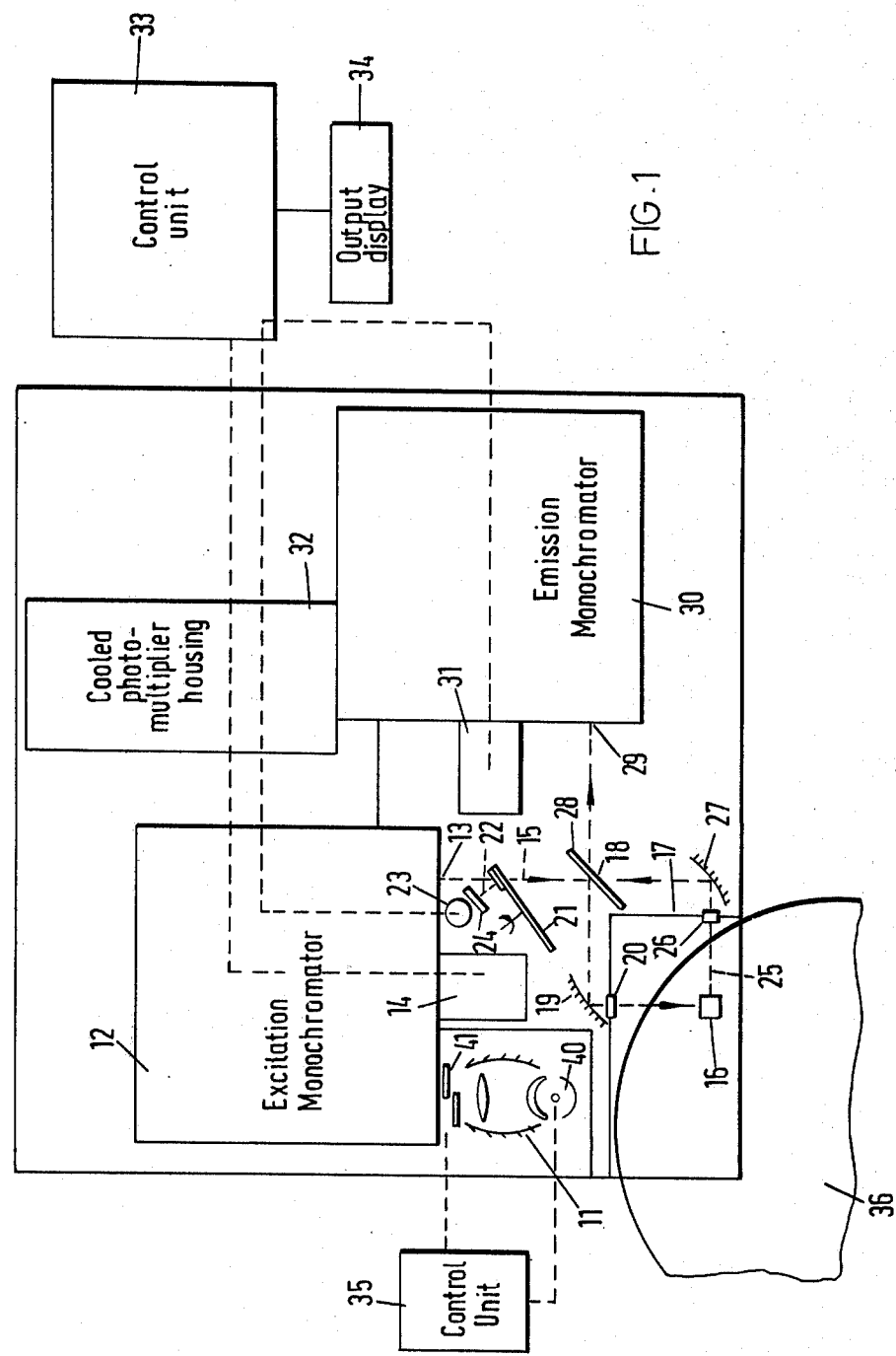
FIG. 1 is a block diagram of one spectrofluorimeter embodying the invention.

The general arrangement shown in FIG. 1 consists of a plasma discharge light source 11 arranged to provide a continuous spectrum in the wavelength range of 200 to 1,000 nanometers. Light from the source is passed intermittently into an excitation monochromator 12 which emits through an outlet slit 13 a beam of radiation at a wavelength controlled by a stepping motor 14, the operation of which adjusts the wavelength transmitted by the monochromator 12. Radiation leaving the slit 13 passes along a path 15 to a sample station 16 provided in a sample housing 17. The radiation on the path 15 is reflected by two mirror faces 18 and 19 through a window 20 in the sample housing 17. The reflecting surface 18 is plane and the mirror 19 is spherical or elliptical. The reflecting surfaces 18 and 19 form a first optical system for focussing onto the sample station 16 radiation passing along the path 15 from the monochromator 12. Located in the radiation path 15 is a device 21 for intermittently reflecting a reference beam 22 to a reference photomultiplier 23. A wavelength converter 24 is provided in the path of the reflected beam immediately in front of the photomultiplier 23. Fluorescence emitted by the sample 16 is detected at right angles to the direction of the incident radiation on the sample 16. The emitted beam 25 leaves the housing 17 through a window 26 and is reflected by a second optical system comprising a spherical mirror 27 and the reverse reflecting face 28 of the mirror 17 into the entrance slit 29 of an emission monochromator 30. The emission monochromator 30 is generally similar to the excitation monochromator 12 and is adjustable in wavelength transmission by a stepping motor 31. Light leaving the emission monochromator is passed into a single photomultiplier 32 which is mounted in a cooled housing. The output from the photomultiplier 32 is fed to a control unit 33 which also receives a signal from the reference photomultiplier 23 and feeds control signals to the stepping motors 14 and 31. The final output signal is given on a display unit 34 connected to the control unit 33. The light source 40 is controlled by a separate control unit 35. The sample housing 17 is located at one corner of the spectrofluorimeter which is formed on a generally rectangular table. In this way the sample station 16 is accessible from two sides of the housing 17 thereby giving access over a range of more than 180°. In this way a rotary table 36 may be arranged to pass through two adjacent sides of the housing 17 allowing automatic delivery and removal of a succession of samples to the sample station 16. In this way automatic handling is possible.

Figure 2:
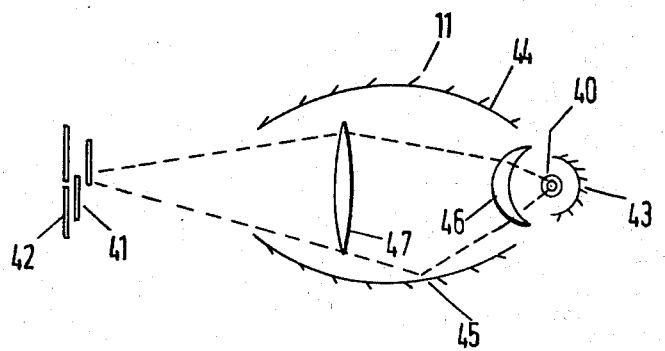
FIG. 2 is an enlarged diagrammatic view of part of the arrangement shown in FIG. 1.
Figure 5:
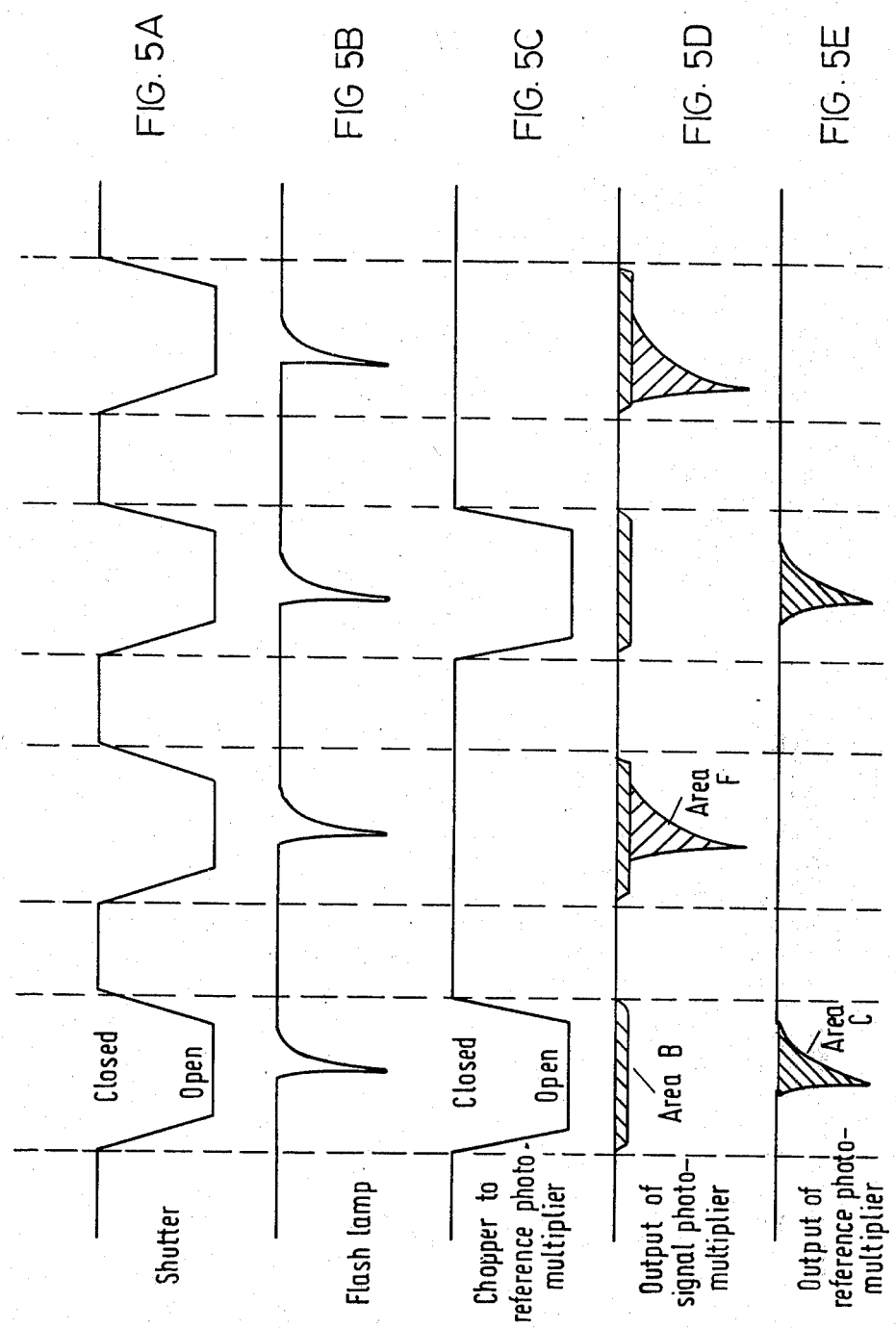

Coming to the component parts in more detail, the light source 11 may incorporate a repetitive flash lamp or a modulated or pulsed light source provided the modulation is greater than 50%. In the particular example described a capillary plasma flash lamp 40 is used. FIG. 2 shows the light source 11 in more detail. This source is preferably in terms of peak intensity, spectral distribution and geometrical size. The lamp is operated with flashes at high current density and this shifts the spectrum emission maximum to shorter wavelengths. It is necessary for the source 11 to emit radiation intermittently at a desired frequency. In the example described, a chopper 41 is provided in front of the entrance slit 42 to the excitation monochromator 12. In this particular case the chopper 41 comprises a vibrating vane device providing complete modulation at any fixed frequency between 1 and 150 cycles per second. This frequency is synchronised with that of the repetitive flash lamp 40 so that the flash from the lamp 40 occurs during a period of transmission through the chopper 41. The pattern of transmission through the chopper 41 is shown in FIG. 5A and the occurrence of flashes from the light source 40 is shown in FIG. 5B.

It is necessary to collect as much light as possible from the source 11 and the optical system shown in FIG. 2 is arranged to match the entrance optics of the monochromator 12. The light gathering power of a monochromator is defined as the slit height of the monochromator divided by the product of the $f^2$ number and the dispersion. In this particular example each 2 the monochromators 12 and 30 consists of a symmetrical Czerny-Turner monochromator of $f/4$ aperture ratio and 200 mm. focal length. Such monochromators are known and the positions of the grating and mirrors within the monochromator are fixed so as to reduce scattered light to a low level and to minimize astigmatism and coma. The optical system shown for the light source 11 in FIG. 2 consists of a spherical mirror 43 behind the lamp 40 and two further spherical mirrors 44 and 45 extending alongside the radiation path through two quartz lenses 46 and 47. Light from the quartz lens 47 is fed to the chopper 41. Such an optical system collects light over a large solid angle and matches the entrance slit of the monochromator 12. The monochromator has a wavelength drive mechanism operated by the stepping motor 14. The stepping motor adjusts a cam within the monochromator to alter the positions of the grating within the monochromator and thereby vary the wavelength transmission. The wavelength accuracy is about plus or minus 1 nanometer. A sine bar drive may be fitted to the monochromator to improve wavelength accuracy and reproducibility. The monochromator is also provided with a dial giving a digital read out of wavelength transmission of the monochromator. This is not shown in FIG. 1 but consists of a potentiometer connected to the wavelength drive connected to the stepping motor with the output read on a digital volt meter. In the example shown, each step on the stepping motor 14 corresponds to a wavelength change of 0.25 nanometers and the scanning speed of the monochromator can be adjusted from 0.01 nanometers per second to 200 nanometers per second in either direction. The emission monochromator 30 and stepping motor 31 are generally the same as already described for the monochromator 12.

Figure 3:
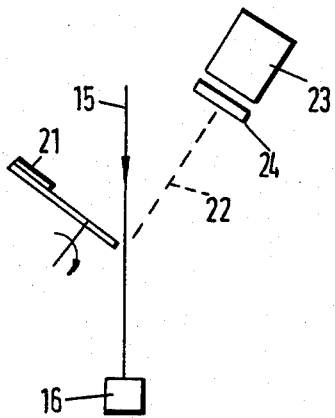
FIG. 3 is an enlarged diagrammatic view of another part of the arrangement shown in FIG. 1.
Figure 4:
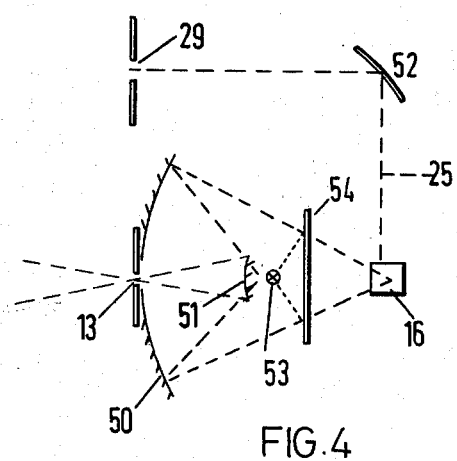
FIG. 4 shows diagrammatically an alternative arrangement for part of the device shown in FIG. 1, FIGS. 5A to E show various waveforms resulting from operation of the spectrofluorimeter shown in FIG. 1.

The arrangement of the reference photomultiplier 23 is shown more clearly in FIG. 3. The flash lamp 40 shows fluctuation in light intensity from shot to shot and it is necessary to use some form of ratio system in the measuring arrangement to compensate for this variation. Furthermore, it is necessary to correct for changes in intensity with changing wavelengths transmitted by the excitation monochromator 12. This is achieved in the present example by use of the reference photomultiplier 23 which feeds a signal to the control unit 33 to compensate for such fluctuations. The excitation beam 15 is fed to a mirror chopper 21. In this case the mirror rotates on a blade in the path of the beam 15 so that excitation light alternately irradiates the sample and the reference photomultiplier. The reflected beam 22 passes through a wavelength converter 24 which in this case incorporates rhodamine dye which absorbes all light from the ultraviolet to about 600 nanometers and converts it to a fluorescence with a maxima at about 650 nanometers which is fed to the reference photomultiplier 23. In this way, the output from the photomultiplier 23 is independent of the wavelength of the excitation beam 15 between about 200 and 600 nanometers. The operation of the mirror 21 is shown in wave form in FIG. 5C. Similarly the output of the reference photomultiplier 23 is shown in wave form in FIG. 5E. It is essential that the reference photomultiplier 23 be arranged to sample the excitation beam before the beam reaches the sample station 16. If this is not the case then the reference photomultiplier is liable to give a false reading due to detecting fluorescence or phosphorescence from the sample. An alternative arrangement for deriving the reference beam 22 is shown in FIG. 4. In this case the excitation beam leaving the exit slit 13 of the monochromator 12 passes through a central aperture in a spherical mirror 50 onto a convex spherical mirror 51. Light is reflected back onto the concave reflecting surface of the mirror 50 and is again reflected onto the sample station 16. In this particular arrangement the fluorescence emitted at right angles along the path 25 is focussed by a spherical mirror 52 onto the entrance slit 29 of the emission monochromator. In this particular case a fibre optic light pipe 53 is arranged behind the mirror 51 so as to derive a reference beam for feeding to the reference photomultiplier 23 which is not shown in FIG. 4. Part of the excitation beam is reflected by a quartz plate 54 onto the pipe 53.

As previously explained, the housing 17 is located at a corner of the rectangular unit whereby the sample station 16 is accessible through two open sides of the housing and thereby permits automatic handling by use of a revolving turntable 36. The housing is also large enough to allow accessories such as Dewar flasks to be used in the housing. Although the corner location for the housing 17 is shown in FIG. 1, it is possible to position the housing in some other projecting part of the device so that access is provided over a range of more than 180°, and a preferred location will be described below with reference to FIG 6.

As can be seen in FIG. 1, the exciting beam is focussed onto the sample station 16 by a first optical system comprising the mirrors 18 and 19 and the emitted radiation is collected by a second optical system consisting of the mirrors 27 and 28. Both the first and second optical systems consist of mirrors rather than lenses and use spherical or elliptical mirrors to achieve focussing. In this way the first and second optical systems are achromatic and corrected for coma. In other words, they are corrected for spherical and chromatic aberrations. This provides greater accuracy of operation as the spectrofluorimeter operates with changing wavelength in both the first and second optical systems described in FIG. 1.

The output of the emission monochromator 30 is fed to the photomultiplier 32. The photomultipliers 23 and 32 are preferably end-on tubes but in some cases side window tubes may be used. Both photomultipliers are operated from a regulated stabilised power supply (now shown).

The control unit 33 incorporates either a lock-in amplifier system, box car detector, or photon counting equipment in order to measure the output of the photomultiplier 32. A box car detector is a known type of synchronous detector used to recover wave forms from noise. All these systems avoid the difficulties of detecting weak signals due to stray light and photomultiplier dark current. When using a lock-in amplifier or box car detector the amplifier is arranged to respond only to those signals arising from the pulsed light source at the chopping frequency of the chopper 41. These signals alone are converted into a D.C. output. The output wave form from the photomultiplier 32 is shown in wave form in FIG. 5D. As can be seen from this wave form, an area B represents dark current from the photomultiplier even when no excitation radiation is directed at the sample. When the sample is irradiated the output of the photomultiplier 32 is indicated by the combined area F+B where F is due to fluorescence and B due to dark current. Although the frequency discriminating system enables accurate detection of the area F+B it is not possible to distinguish between the area F and the area B. The output of the reference photomultiplier 23 is indicated by the area C in FIG. 5E and the control unit 33 is arranged to provide an output representing the quantity F+B divided by C.

Improved detection can be used by a photon counting system. Such a system provides improved signal to noise ratio where the signals to be detected may be buried in noise. In such a system, individual current pulses from the photomultiplier cathode are amplified, detected and counted. The count rate is a measure of the rate at which photons are striking the photocathode. This is particularly useful where the radiation, as in fluorescence, is frequently so low in intensity that it is difficult to obtain reliable measurements by other techniques. When using counting techniques, photon counting can be carried out for each of the areas B, C and F+B shown in FIGS. 5D and 5E. Photon counting is carried out even when the excitation beam is not incident on the sample so that a photon count representing area B is obtained. In this way, the control unit 33 can be arranged to subtract the count for the area B from the count obtained for the area A and thereby obtain the quantity (F+B)-B. As in the case of lock-in amplification, it is then necessary to obtain the ratio of this signal with the area C derived from the reference photomultiplier so as to compensate for changes in light intensity from the light source.

Figure 6:
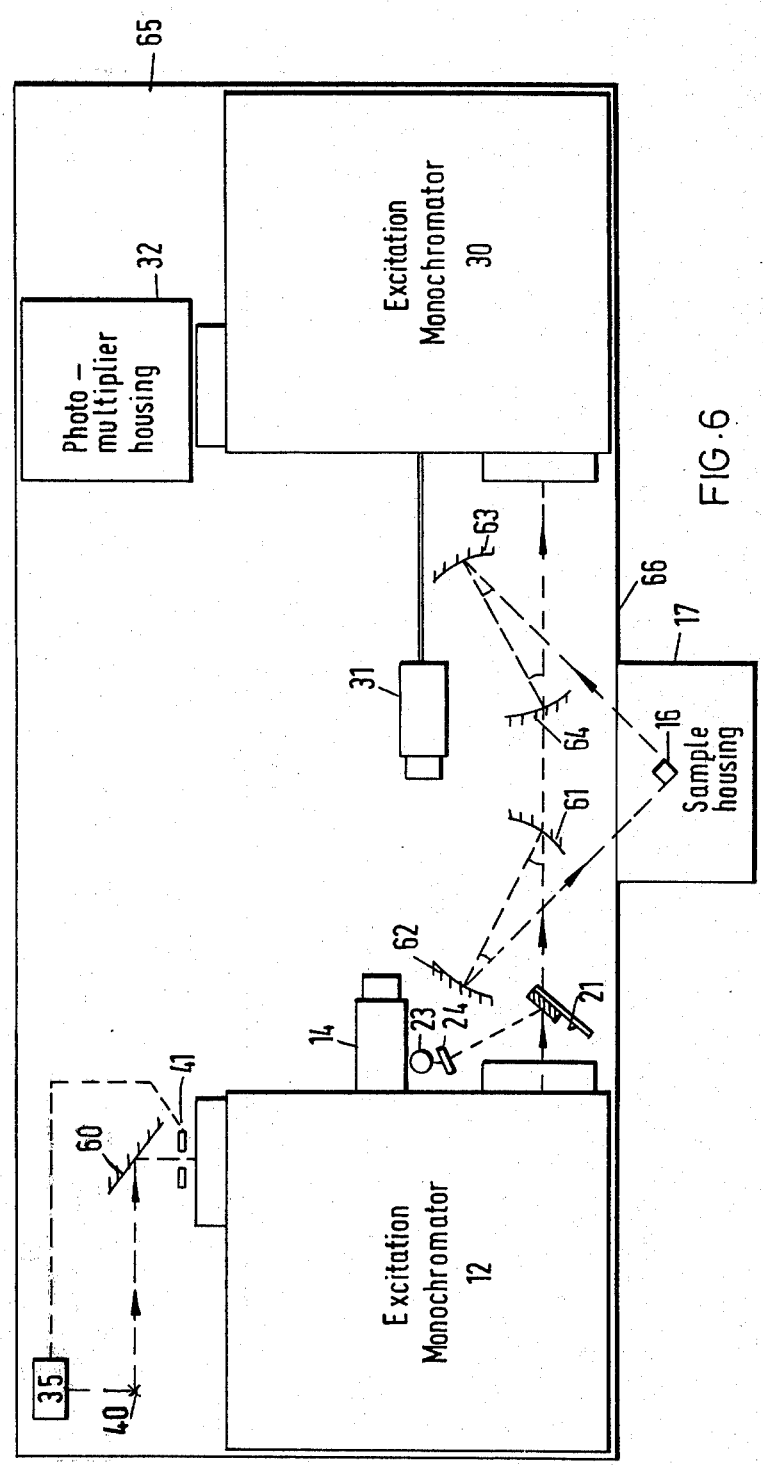
FIG. 6 shows a preferred arrangement of a spectrofluorimeter embodying the invention.

A preferred arrangement for the spectrofluorimeter is shown in FIG. 6.

The components used are generally the same as those previously described with reference to FIG. 1 and like parts have been marked with the same reference numerals as in FIG. 1. Light from a plasma discharge flash lamp 40, forming part of a source similar to that shown in FIG. 2, passes via a plane mirror 60 and chopper 41 into the excitation monochromator 12. Light from the monochromator 12 passes via a device 21, which reflects some light through the wavelength converter 24 to the reference photomultiplier 23, to a first curved mirror 61. Light is reflected from the mirror 61 to a second curved mirror 62 which is arranged to reflect light onto the sample station 16 which is located in a sample housing 17. Luminescence emitted by the sample is received by a third curved mirror 63 which reflects light onto a fourth curved mirror 64. Light reflected by the mirror 64 passes to the emission monochromator 30. Both monochromators 12 and 30 are adjusted by stepping motors 14 and 31 as previously described. The output of the monochromator 30 is viewed by the photomultiplier 32 as previously described. The photomultiplier 32 as well as the stepping motors and reference photomultiplier 23 are coupled to a control unit (not shown) similar to that described with reference to FIG. 1. In the example shown in FIG. 6, the unit is mounted on a rectangular supporting table 65 with the monochromators 12 and 30 located at the two corners of the front of the table 65. This provides easy access to the monochromators for controlling their operation. The optical paths between the mirrors 61 and 64 and the monochromators 12 and 30 respectively extend parallel to the front edge 66 of the table 65. The mirrors 61, 62, 63 and 64 may be spherical or elliptical and each is located so that incident light has an angle of incidence not greater than 30°. In this way, the mirrors 61, 62, 63 and 64 provide optical systems corrected for spherical and chromatic aberrations. The sample housing 17 is arranged to project forwardly from the table 65 mid-way along the front edge 66. In this way access to the sample station 16 is increased and is provided on three sides of the housing 17. Samples may be conveyed on an automatic conveying system parallel to the edge 66 entering the housing 17 at one side and leaving through the opposite side.

The spectrofluorimeters described above are particularly sensitive and suitable for measuring materials in which the product of optical density at the exciting wavelength and the fluorescence quantum yield is less than $10^{-9}$. For example, carcinogenic materials such as dibenzanthracene may be determined when they are present in concentrations of less than $10^{-10}$ M. The instruments are, of course capable of measuring much higher concentrations of fluorophor than this.

The invention is not limited to the details of the foregoing examples. Although the light source 11 is shown with a separate chopper 41 to achieve the desired predetermined frequency from the light source, it may be suitable in some cases to operate the lamp 40 at a predetermined frequency and avoid the need for a separate chopper 41.

I claim:

1. A spectrofluorimeter for detecting intensity of luminescence at various wavelengths emitted by a sample under test, which comprises a sample station whereat a sample may be located at a predetermined location, a flash or pulsed source of light, including a plasma discharge lamp, arranged to produce exciting radiation over a continuous range of wavelengths and emit radiation with intermittent intensity peaks at a desired frequency, an excitation monochromator located between the source and the sample station for transmitting radiation at a selected wavelength towards the sample, a first optical system arranged to focus light from the excitation monochromator at the sample station, means located in the radiation path between the excitation monochromator and the sample station to direct a reference beam of radiation to a reference radiation detector and thereby provide a correction signal for fluctuations in light intensity from the source, an emission monochromator arranged to receive luminescence from the sample under test via a second optical system and transmit radiation at a selected wavelength towards a detection system, stepping motors coupled to respective monochromators for varying the wavelength of radiation transmitted by the monochromators, the detection system including a photomultiplier responsive to the radiation transmitted by the emission monochromator and arranged to provide a signal dependent on the intensity of luminescence at the wavelength transmitted by the emission monochromator, and the first and second optical systems being corrected for spherical and chromatic aberrations.

2. A spectrofluorimeter according to claim 1 wherein the first and second optical systems comprise spherical or elliptical mirrors and thereby avoid the use of lenses.

3. A spectrofluorimeter according to claim 1 wherein the detection system includes a lock-in amplifier arranged to detect signals from the photomultiplier only at the said desired frequency at which light is emitted from the light source.

4. A spectrofluorimeter according to claim 1 wherein the detection system includes a box car detector arranged to detect signals from the photomultiplier only at the said desired frequency at which light is emitted from the light source.

5. A spectrofluorimeter according to claim 1 wherein the detection system includes a photon counting system.

6. A spectrofluorimeter according to claim 1 wherein the reference radiation detector comprises a photomultiplier arranged to receive an intermittent signal from the radiation beam directed towards the sample station.

7. A spectrofluorimeter according to claim 6 wherein the reference photomultiplier is arranged to compensate for variations in intensity of the excitation beam with wavelength as well as time.

8. A spectrofluorimeter according to claim 7 wherein the reference photomultiplier includes a wavelength converter in the radiation path leading to the reference photomultiplier so that as the wavelength of radiation directed towards the sample is changed, the wavelength converter converts the radiation to a fixed wavelength or spectrum so that the reference photomultiplier always receives radiation of the same wavelength.

9. A spectrofluorimeter according to claim 1 wherein the means located between the excitation monochromator and the sample station to direct radiation to the reference radiation detector comprises a reflecting device arranged to provide intermittent reflection to the reference photomultiplier.

10. A spectrofluorimeter according to claim 1 wherein the sample station is located in a housing having access over more than one side of the housing.

11. A spectrofluorimeter according to claim 10 wherein the housing is arranged to project at one edge or side of the spectrofluorimeter so that access to the housing is provided on three sides.

* * * * *